March 21, 1961 H. H. RUMPEL 2,975,865
JAW CRUSHER LUBRICATION
Filed June 25, 1958 3 Sheets-Sheet 2
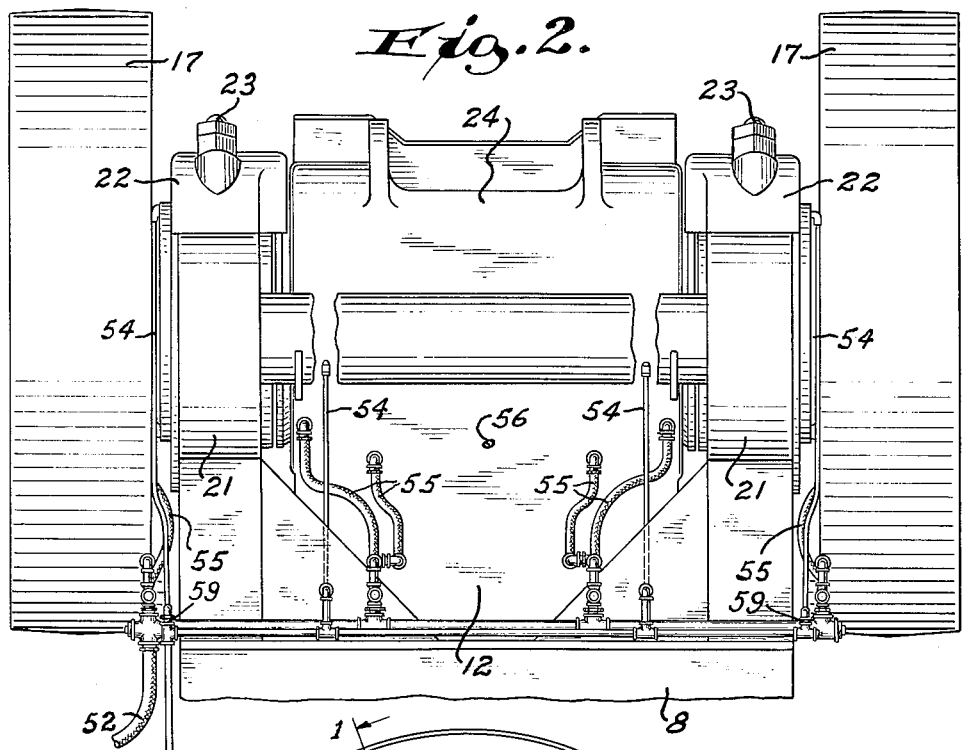
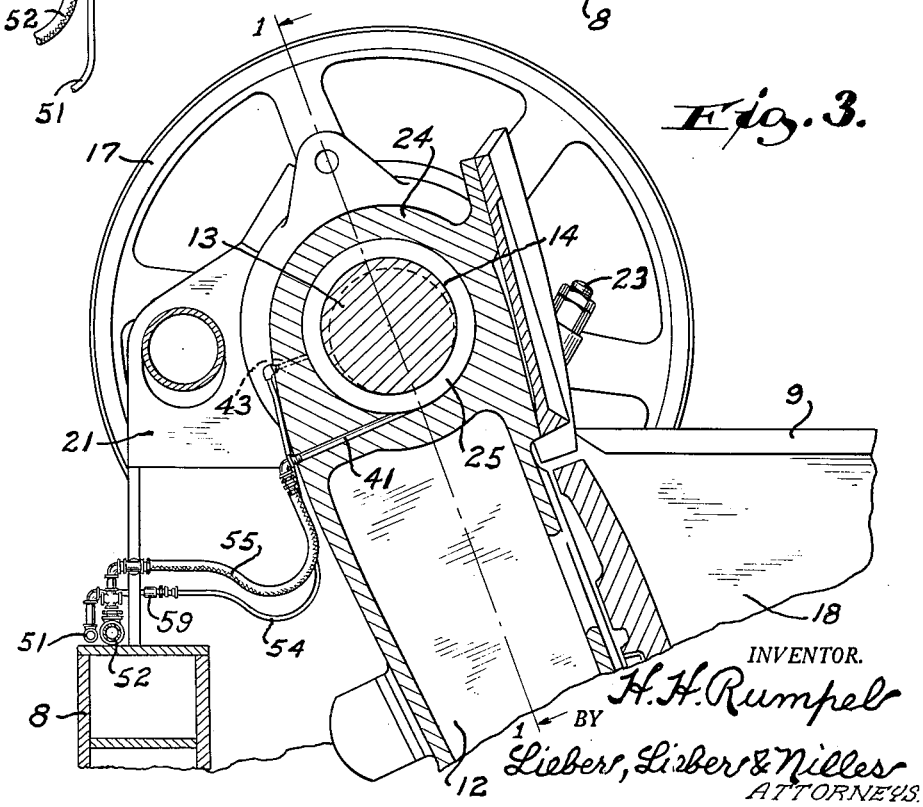
INVENTOR.
H. H. Rumpel
BY
Liebert, Liebert & Nilles
ATTORNEYS.

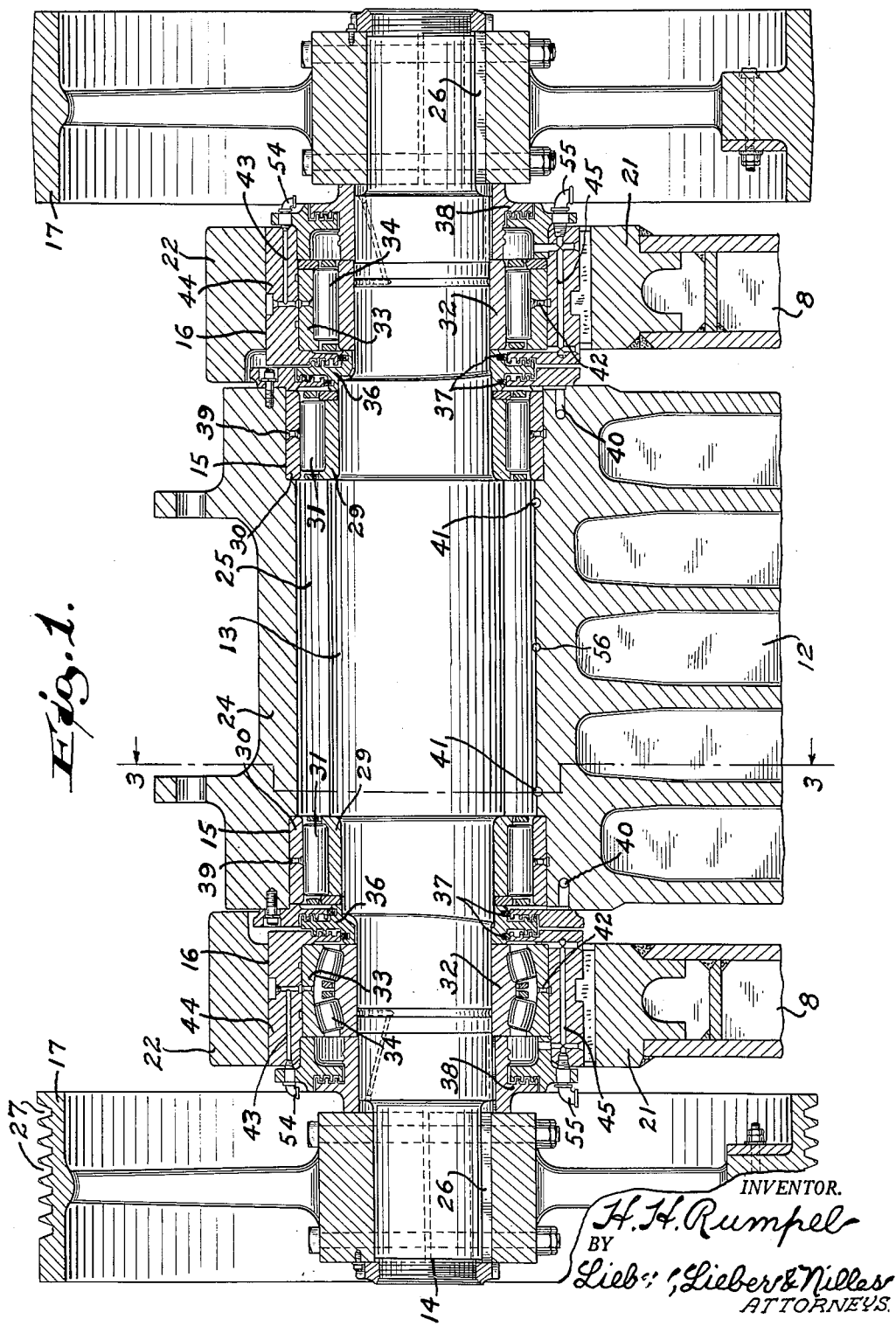

March 21, 1961  H. H. RUMPEL  2,975,865
JAW CRUSHER LUBRICATION
Filed June 25, 1958  3 Sheets-Sheet 3
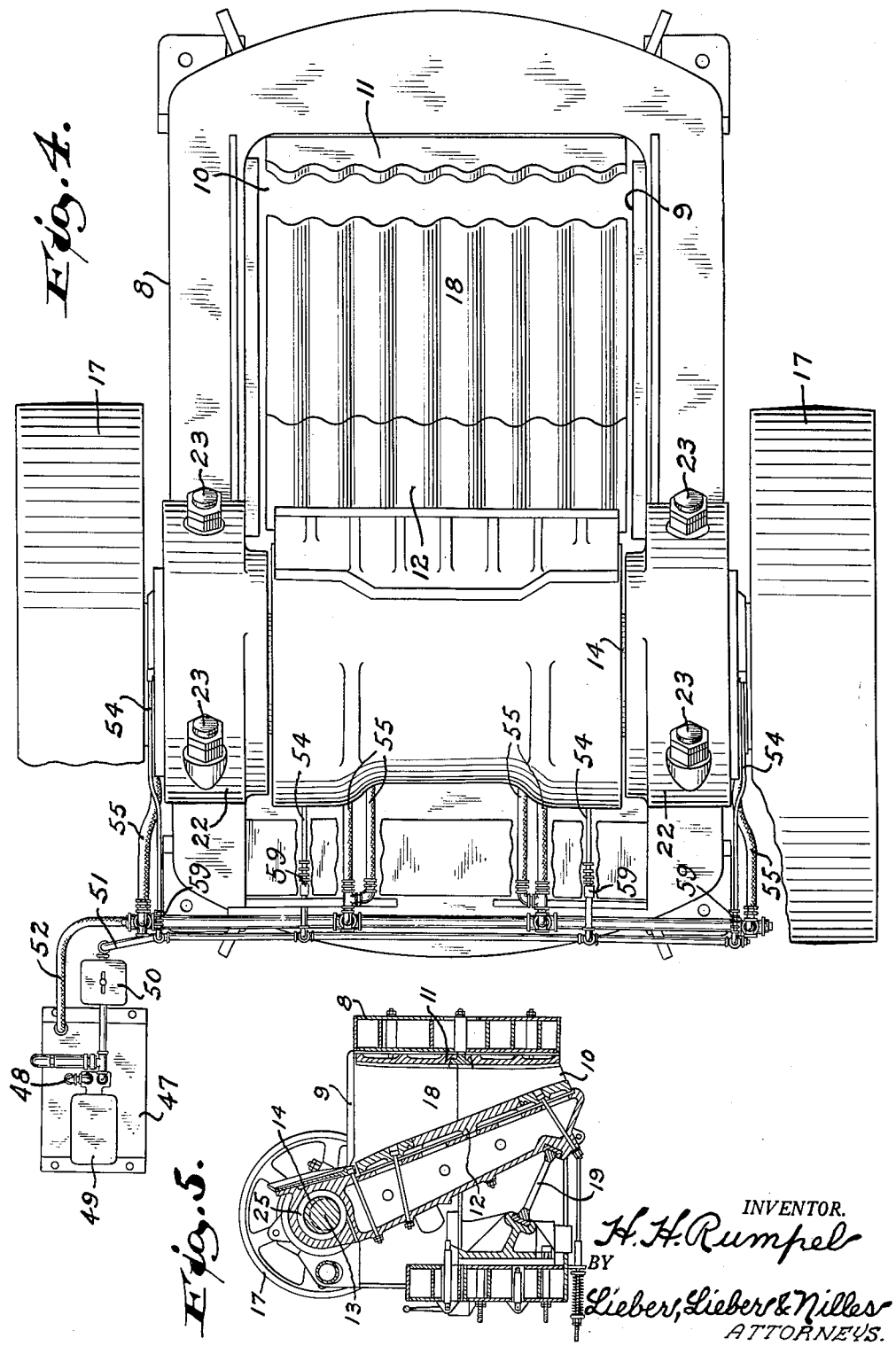

United States Patent Office 2,975,865
Patented Mar. 21, 1961

2,975,865

JAW CRUSHER LUBRICATION

Harvey H. Rumpel, Sullivan, Wis., assignor to Smith Engineering Works, Milwaukee, Wis., a corporation of Wisconsin Filed June 25, 1958, Ser. No. 744,604

1 Claim. (Cl. 184—7)

This invention relates generally to improvements in crushers for rock, ore and the like, and it relates more specifically to an improved system for lubricating the bearings of crushers of the type having relatively movable jaws separated by an intervening crushing zone.

The primary object of the present invention is to provide an improved system for most effectively lubricating the jaw suspension and actuating bearings of a jaw crusher.

In jaw crushers of the type wherein a pair of relatively movable jaws are separated by an intervening crushing chamber and at least one of the jaws is pivotally suspended from an overhead rotary driving shaft journalled in axially spaced stationary bearings carried by the crusher frame, while the jaws are movable to effect crushing by one or more eccentric portions on each suspension shaft located between the fixed journal bearings and which are embraced by gyratory bearings, both the stationary and gyratory bearings are normally subjected to tremendous pressures and must therefore be properly lubricated. In the larger size jaw crushers of this type, four anti-friction roller bearings, two of which are stationary while the other two are gyratable or eccentric, are usually provided on each overhead jaw suspension shaft, and these bearings are ordinarily lubricated by being confined in grease or immersed in a sealed bath of oil.

During normal operation of such crushers, metallic particles frequently wear off of the rollers and confining cages or races of the bearings, and these particles remain embedded or suspended in the confined grease or oil bath thus eventually producing indentations in and rapid wear of the bearing elements which naturally causes spalling and disintegration of the bearings to an extent sufficient to require replacement after relatively short periods of operation. Since these large roller bearings are very expensive and are also rather difficult to renew, the prior large jaw crushers were costly to maintain in operation due to rapid bearing failure. Then too, these prior systems of lubrication did not provide sufficient cooling effect to prevent the bearings from overheating, and thus also contributed to early destruction of the roller bearing elements.

It is therefore an important object of the present invention to provide an improved lubricating system for larger jaw crushers of the above-mentioned type, which obviates the objectional features of the prior devices and insures effective functioning of such crushers for longer periods and at lower costs.

Another important object of this invention is to provide an improved lubricating assemblage for the antifriction bearings of a jaw crusher, wherein the bearings are constantly lubricated and flushed with clean oil circulated therethrough in metered quantities and under pressure.

A further important object of the invention is to provide an improved jaw crusher bearing lubrication installation, in which the various bearings are all equally subjected to streams of clean and cool oil in order to insure efficient lubrication and to prevent overheating.

Still another important object of this invention is to provide an improved mode of lubricating the elongated roller bearings of a jaw crusher, by introducing fresh oil under pressure into the medial portion of each bearing and causing the oil to flush foreign matter from the bearing surfaces toward and from the opposite bearing ends, so as to prevent accumulation of worn-off metal particles in these bearings.

An additional important object of the invention is to provide a system for most effectively lubricating the several bearings of an overhead suspended eccentric actuated type of jaw crusher by supplying pure oil in metered quantities under pressure from a common supply source to which the spent oil is returned by gravity and wherein this returned oil is filtered before being recirculated through the bearings.

These and other more specific objects and advantages of the invention will be apparent from the following description.

A clear conception of the features constituting the present improvement, and of the construction and functioning of a typical commercial jaw crusher bearing lubrication system embodying the invention, may be had by referring to to the drawings accompanying and forming a part of this specification wherein like reference characters designate the same or similar parts in the various views.

Fig. 1 is a central longitudinal section through the overhead jaw suspension and actuating bearings for the movable jaw of a crusher, depicting the normally concealed portions of the improved lubrication system and the section having been taken along the line 1—1 of Fig. 3;

Fig. 2 is a rear elevation of the overhead movable jaw suspension portion of the crusher, having parts broken away to more clearly show some of the oil feed and return ducts of the lubricating system;

Fig. 3 is a transverse vertical section through the upper suspension portion of the movable jaw of the same crusher, the section having been taken along the line 3—3 of Fig. 1;

Fig. 4 is a top view of the same jaw crusher with portions of the flywheel pulleys and other parts broken away in order to clearly show the improved lubrication system; and Fig. 5 is a central vertical section through a complete overhead suspended jaw crusher of the same general type as that illustrated in Figs. 1 to 4 inclusive, drawn to a considerably smaller scale and with the lubricating system omitted.

While the invention has been shown and described herein as having been embodied in an overhead suspended jaw crusher having only one movable crushing jaw cooperating with only one stationary crushing jaw, it is not intended to confine the use of the improved lubrication system specifically to such a jaw crusher; and it is also contemplated that specific descriptive terms employed herein be given the broadest possible interpretation consistent with the actual disclosure.

Referring especially to Figs. 1 and 5 of the drawings, the jaw crusher illustrated therein comprises in general, a main frame 8 having an upper material inlet opening 9 and a lower crushed product discharge opening 10; an upright stationary crushing member or jaw 11 spanning the front end of the frame 8; and inclined movable crushing member or jaw 12 swingably suspended at its upper end from the medial eccentric portion 13 of a horizontal driving shaft 14 by spaced gyratory bearings 15, the opposite end portions of the shaft 14 being journalled in stationary bearings 16 carried by the opposite sides of the frame 8 and the extreme overhung outer ends of this shaft being provided with flywheel drive pulleys 17, while the movable jaw 12 also spans the main frame and coacts with the fixed jaw 11 to provide a downward diverging intervening crushing chamber 18; and a reaction toggle link 19 interposed between the lower end of the movable jaw 12 and the rear wall of the frame 8.

The main frame 8 is of approximately rectangular sturdy construction with spaced end walls interconnected by opposite side walls, the upper end of each of which has a lower socket 21 rigidly united therewith and provided with a removable cap 22 firmly but detachably secured thereto by stud bolts 23 so as to confine the adjacent fixed bearings 16 in axial alinement with each other, see Figs. 1 to 4 inclusive. The upper end of the movable crusher jaw 12 is provided with an integral hub 24 within the opposite ends of which the gyratory bearings 15 are snugly confined and the medial part of which is spaced from the adjacent eccentric portion 13 of the driving shaft 14 to provide an annular chamber 25 located between the bearings 15, as shown in Figs. 1 and 3. The driving shaft 14 is of one-piece construction, and the flywheel pulleys 17 are firmly attached to the outer overhanging ends of this shaft by means of keys 26, and the peripheries of one or both of these driving pulleys 17 may either be crowned for the reception of flat propelling belts, or they may be provided with grooves 27 as shown at left of Fig. 1 for coaction with V-belts, in a well-known manner.

All of the foregoing crusher construction is old and well-known, and the present invention relates primarily to the mode of effecting proper lubrication of the bearings 15, 16. These bearings are all of the anti-friction or roller type, and each gyratory bearing 15 comprises an inner annular race 29 firmly secured to the medial eccentric portion 13 of the shaft 14 and an outer annular race 30 with a series of cylindrical rollers 31 confined therebetween, while each of the stationary bearings 16 comprises an inner annular race 32 firmly secured to the shaft 14 coaxially of the pulleys 17 and an outer annular race 33 with a series of rollers 34 confined therebetween. In order to prevent axial displacement of the shaft 14, one of the bearings 16 may be formed as a thrust bearing either cylindrical or tapered as shown at the left of Fig. 1, and the rollers 34 of the other bearing 16 may be either cylindrical or tapered.

The adjacent bearings 15, 16 at each end portion of the shaft 14, are sealed from each other by means of a rotary labyrinth sealing disk 36 and a pair of sealing rings 37, and the outer end of each fixed bearing 16 is also sealed by means of a rotary labyrinth sealing disk 38, while the inner ends of both of the eccentric bearings 15 are in open communication with the chamber 25 in the upper hub 24 of the oscillatory crusher jaw 12, see Fig. 1. Each of the eccentric bearings 15 is provided with a series of relatively small oil supply holes or passages 39 extending radially through the center of its outer race 30 and which communicate outwardly along the cylindrical rollers 31 and through the annular gaps at the outer bearing ends with oil return ducts 40 formed in the movable jaw hub 24, as shown in Fig. 1. The chamber 25 is provided with several oil escape conduits 41 which also communicate with the central passages 39 through the open inner ends of the bearings 15, so that the oil delivered centrally to the rollers 31 of these bearings 15 through the passages 39 will travel in opposite directions along these rollers and the races 29, 30 and flow freely into the ducts 40 connected to hoses 55 and with chamber 25 and the conduits 41. Each of the stationary bearings 16 is also provided with a series of relatively small oil supply holes or passages 42 extending radially through the mid-portion of its outer race 33 and which communicate with oil ducts 43 formed in a bearing housing ring 44, and the opposite ends of each bearing 16 communicate with oil escape conduits 45 formed in the adjacent ring 44 so that the oil supplied centrally to the rollers 34 of these bearings 16 may also travel in opposite directions along these rollers and their confining races 32, 33 and escape through the conduits 45. The oil flow to each bearing may be metered or regulated by special fittings 59 interposed in the oil supply lines 54 and which embody detachable inserts having passages of proper size to produce the required flow of oil to each bearing.

As illustrated in Fig. 4, the bearing lubricating oil supply may be derived from the reservoir 47 containing an abundant quantity of the lubricant, and the oil may be withdrawn from this reservoir by a gear pump 48 operated by an electric motor 49 or by any other suitable means, and is delivered under pressure through a purifier 50 such as a suitable filter, into an oil feed pipe 51. The spent oil derived from the bearings 15, 16 may be returned by gravity through a pipe line 52 of somewhat larger diameter than the pipe 51, and the oil circulating unit may be placed in any protected locality and may also be provided with a suitable signaling device in order to insure proper functioning thereof.

As shown in Figs. 2 to 4 inclusive, the pressure oil feed line 51 may be connected by relatively flexible piping 54 and special pipe fittings 59, with the passages 39 for supplying oil to the medial portions of the eccentric bearings 15 and with ducts 43 for likewise delivering oil to the stationary shaft bearings 16, so that metered quantities of fresh and cool oil from the filter of purifier 50 will be simultaneously fed through the fittings 59 to all of these bearings 15, 16. The return pipe line 52 is connected by flexible hoses 55 and ordinary pipe fittings, with the conduits 41, 45 so that the spent oil may gravitate freely to the reservoir 47, and the medial portion of the jaw chamber 25 may also be provided with a central oil drain opening 56 which is normally closed by a removable plug. The several branches of the oil feed line 51 may also be provided with flow control valves in order to insure uniform flow of oil to all of the bearings 15, 16.

When the improved lubricating system has been properly constructed and installed as hereinabove described, and the reservoir 47 has been supplied with an abundance of fresh clean oil, the pump 48 should be initially operated to supply the bearings 15, 16 with lubricant before the jaw crusher is placed in operation. After the bearings 15, 16 have been thus lubricated, rotary motion may be applied to either or both of the flywheel pulleys 17 so as to rotate the shaft 14, thereby causing the medial eccentric portion 13 of this power shaft to gyrate and to oscillate the movable jaw 12 relative to the stationary jaw 11. This oscillation of the jaw 12 is more extensive at its upper suspension portion 24 than at its lowermost portion which coacts with the reaction link 19 to cause the lower end of the jaw to reciprocate slightly up and down while also oscillating back and forth to a slight extent. The material which is to be crushed may then be introduced into the upper enlarged end of the tapered crushing zone 18 through the inlet opening 9 and as it is progressively reduced it advances by gravity through the zone 18 and is ultimately delivered through the lower outlet opening 10.

While this crushing is being effected, the pump 48 constantly delivers oil from the reservoir 47 through the purifier 50 and the feed pipe 51 under pressure and in properly controlled quantities as determined by the metering devices or fittings 59 into the medial portion of each of the anti-friction bearings 15, 16 through the piping 54, ducts 43 and passages 39, 42. The purified and relatively cool oil thus admitted under pressure centrally and simultaneously into all of these bearings 15, 16 flows toward and is finally discharged from the opposite ends of each bearing, thus effectively lubricating and cooling the bearing elements while also flushing and removing foreign matter from the bearing surfaces. The spent oil delivered from the outer ends of the gyrating roller bearings 15 escapes through the ducts 40 while the oil escaping from the inner ends of these bearings flows into the chamber 25 in the movable jaw hub 24 and from there it gravitates through the conduits 41 and hose lines 55 back toward the reservoir 47, and the spent oil likewise delivered from the opposite ends of the fixed roller bearings 16 flows through the conduits 45 in the housing rings 44 and also gravitates through other hose lines 55 toward the reservoir 47. All of the spent lubricant derived from the several branch lines 55 is collected by and returned to the reservoir 47 through the common return line 52, thus completing the oil circulation cycle.

From the foregoing detailed description of the construction and operation of a typical commercial jaw crusher and its lubricating system, it should be apparent that the present invention in fact provides an oiling assemblage which not only insures abundant lubrication of the bearings 15, 16 but also positively prevents accumulation of foreign matter such as metal particles which have been worn from the bearing surfaces, upon these surfaces. The constant purification of the oil supply remote from the bearings also serves to cool this liquid lubricant and results in eliminating over heating of the bearings 15, 16, and the injection of the oil preferably medially of each bearing and the sealing of the adjacent bearings 15, 16 from each other insures proper lubrication of each bearing independently of all of the others. Then too, by regulating or metering the flow of oil to each bearing, the oil flow may be uniformly distributed throughout the entire system.

The improved lubricating system specifically shown and described herein has gone into highly satisfactory and successful commercial use as applied to a jaw crusher having a single overhead suspended movable jaw 12, but the improved oiling system may obviously be advantageously utilized on jaw crushers of other types. It is also noteworthy that while the medial introduction of the oil to each bearing 15, 16 may be preferable, it is not essential since this admission may also take place at the ends of selected bearings, but the provision of the large oil collecting chamber 25 within the jaw hub 24 between the bearings 15 is an important feature of the present invention. It should therefore be understood that it is not desired to limit the invention to the exact details of construction and functioning of the oiling system herein specifically described and illustrated, for various modifications within the scope of the appended claim may occur to persons skilled in the art.

I claim:

In a jaw crusher, a jaw suspension and actuating shaft, a frame having thereon axially alined and spaced shaft supporting roller bearings one of which is formed to absorb end thrust on the shaft, said shaft having a pair of eccentric portions axially spaced apart from one another and each adjacent a shaft supporting bearing, a movable jaw having a suspension hub disposed between said shaft supporting bearings, roller bearings on said eccentric portions mounting said jaw hub on said shaft, the bearings mounted on said eccentric portions each comprising a single set of rollers, said eccentrically mounted roller bearings being sealed from the shaft supporting bearings while being in open communication with but separated from each other by a spent oil collecting chamber formed within said hub and between the eccentric portions, an oil supply reservoir, an oil conduit for conducting oil from said reservoir into the medial portion of all of said bearings, each of said conduits having therein a metering device for regulating the quantity of oil flowing therethrough, a pump for forcing oil under pressure into said bearings through said conduits and said metering devices, and independent lines for returning oil by gravity from the opposite ends of all of said bearings to said reservoir, several of said return lines communicating with the adjacent ends of said eccentrically mounted bearings through said oil collecting chamber.

References Cited in the file of this patent

UNITED STATES PATENTS

| | | |
|---|---|---|
| 2,240,118 | Matthews | Apr. 29, 1941 |
| 2,331,984 | Kocher | Oct. 19, 1943 |
| 2,349,597 | Nenninger et al. | May 23, 1944 |
| 2,593,116 | Danly et al. | Apr. 15, 1952 |
| 2,598,942 | Rumpel | June 3, 1952 |
| 2,867,481 | Hornbostel | Jan. 6, 1959 |

FOREIGN PATENTS

| | | |
|---|---|---|
| 112,045 | Australia | Nov. 29, 1940 |